(12) United States Patent
Heitzer

(10) Patent No.: US 6,502,661 B1
(45) Date of Patent: Jan. 7, 2003

(54) STEERING SYSTEM FOR A VEHICLE

(75) Inventor: Heinz-Dieter Heitzer, Heinsberg (DE)

(73) Assignee: TRW Fahrwerksysteme GmbH & Co. KG, Dusseldorf (DE)

( * ) Notice: Subject to any disclaimer, the term of this patent is extended or adjusted under 35 U.S.C. 154(b) by 0 days.

(21) Appl. No.: 09/648,356

(22) Filed: Aug. 25, 2000

(30) Foreign Application Priority Data

Aug. 30, 1999 (DE) .......................... 299 15 179

(51) Int. Cl.$^7$ ................................ B62D 5/06
(52) U.S. Cl. ..................... 180/403; 180/406
(58) Field of Search ................ 180/403, 406, 180/422, 423, 432, 433, 434, 441, 442

(56) References Cited

U.S. PATENT DOCUMENTS

| | | | | |
|---|---|---|---|---|
| 5,862,878 A | * | 1/1999 | Bohner et al. | 180/403 |
| 5,953,978 A | * | 9/1999 | Bohner et al. | 180/422 |
| 6,112,844 A | * | 9/2000 | Bohner et al. | 180/403 |
| 6,209,677 B1 | * | 4/2001 | Bohner et al. | 180/406 |

FOREIGN PATENT DOCUMENTS

| | | |
|---|---|---|
| DE | 4422386 C1 | 9/1995 |
| DE | 19627893 C2 | 11/1997 |
| DE | 19603568 C2 | 3/1998 |
| DE | 19801398 C1 | 7/1999 |
| JP | 08337176 A | 12/1996 |
| JP | 10100920 A | 4/1998 |
| WO | WO 8809281 | 12/1988 |

* cited by examiner

Primary Examiner—Anne Marie Boehler
(74) Attorney, Agent, or Firm—Tarolli, Sundheim, Covell, Tummino & Szabo L.L.P.

(57) ABSTRACT

The invention relates to a vehicle steering system comprising a steering linkage, a control hydraulic motor and a control hydraulic circuit, a steering wheel connected to the control hydraulic motor, and a control hydraulic cylinder connected to the control hydraulic motor by the control hydraulic circuit. The vehicle steering system further comprises a servohydraulic cylinder, a servopump, a servohydraulic circuit connecting the servopump to the servohydraulic cylinder, and an electronic control circuit which controls the servohydraulic circuit.

4 Claims, 1 Drawing Sheet

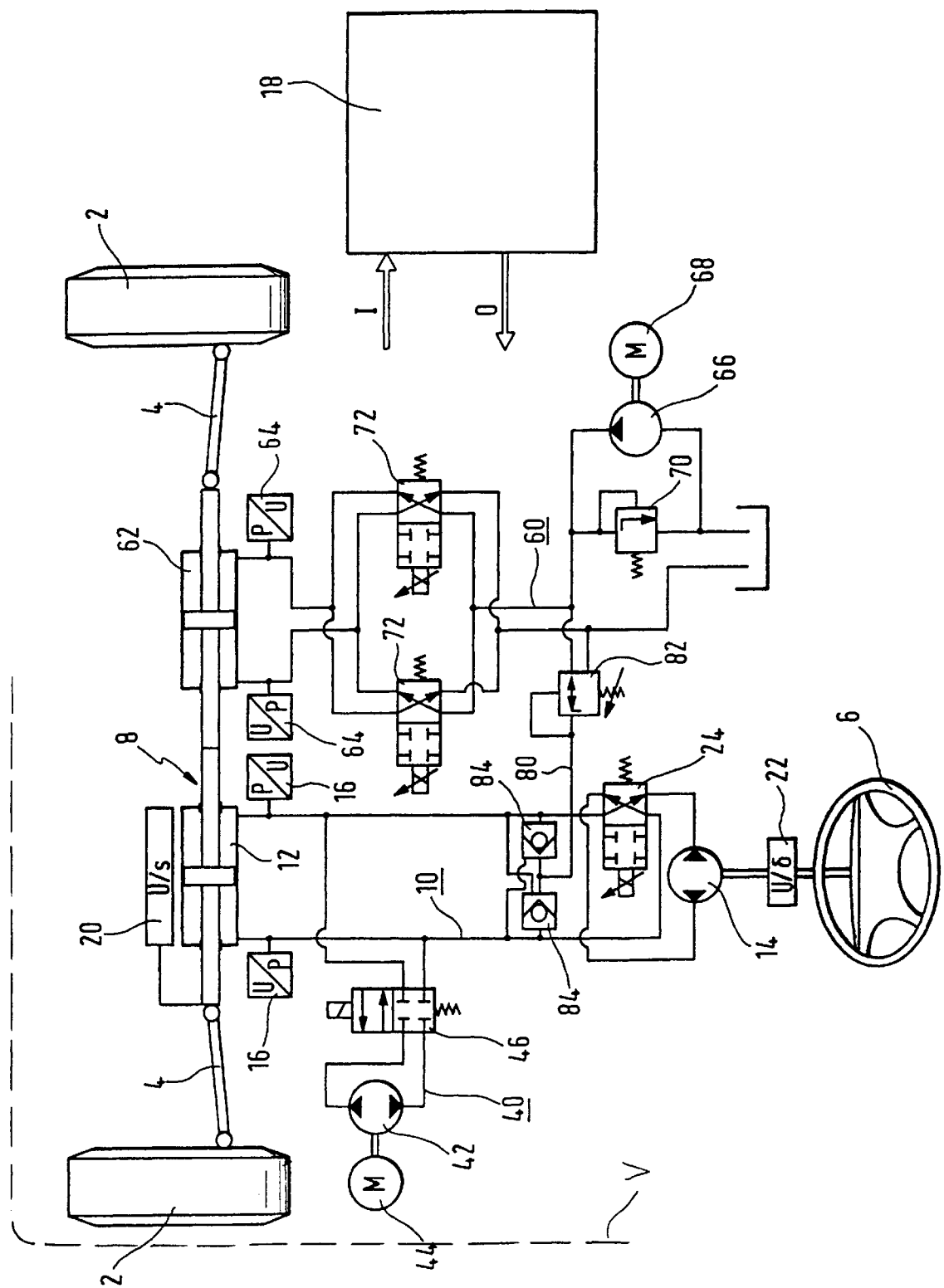

STEERING SYSTEM FOR A VEHICLE

TECHNICAL FIELD

The invention relates to a steering system for a vehicle in which no mechanical connection exists between the steering wheel and the steering linkage of the vehicle.

BACKGROUND OF THE INVENTION

Such steering systems are known as "steer-by-wire" systems. In such systems the steering movement of the steering wheel is transmitted electronically from the steering wheel to the steering linkage by the setpoint steering angle input by the driver being transmitted "by wire" firstly to an electronic control circuit which then sends "by wire" a positioning command to an actuator which may be embodied as an hydraulic or electric servomotor and produces the steering movement at the front axle steering linkage. In this arrangement the electronic control circuit processes signals received from various sensors. The two most important signals are the setpoint value for the steering angle as input by the driver at the steering wheel, and the actual value of the position of the steering linkage at the front wheels resulting from the positioning movement of the actuator. Further signals may be, for example, the speed and the yaw rate of the vehicle.

In addition to the function of dictating the steering movement of the front wheels such a steering system has the task of furnishing the driver with a haptic signal, i.e. giving him a "feel" for the road contact of the front wheels. Thus, a steer-by-wire system not only needs to be able to translate the steering movements of the driver into positioning movements at the wheels but also to produce the restoring forces at the steering wheel relating to the cornering forces transmitted between the road surface and the front wheels. For this purpose a further actuator is needed which is connected to the steering wheel, this actuator too, being signaled electronically. However, it is not the function of this actuator to implement a positioning movement, it instead serving to produce a haptic counter moment at the steering wheel for the driver. For this purpose the electronic control circuit needs to process information as to the cornering forces at the wheels of the front axle. This information is made available either by force sensors arranged in the steering linkage or is derived from the hydraulic pressure acting on the actuator or the applied current strength to indirectly receive a measure for the cornering forces at the wheels of the front axle.

The advantage of such a steering system as compared to a conventional, mechanical steering system is, more particularly, that the steering translation is freely selectable, for example, as a function of the speed of the vehicle. The boost in the steering force is likewise freely programmable. As an additional function an active, dynamic correction of the steering angle may be provided serving to enhance the steadiness of driving. This function is comparable to that of so-called ESP systems which provide automatic braking in enhancing the steadiness of driving. Finally, the steering may also be made use of for automatic tracking and in preventing collision.

One important consideration as regards steer-by-wire systems is their fail-safe response, i.e. single defects in the system, which cannot be excluded with a probability bordering on certainty, must never result in total failure of the system and thus to loss of vehicle steerability. To satisfy this requirement all active safety-relevant chassis systems make use of a fallback based on conventional engineering, enabling a defective active system to be rendered safe by taking it out of circuit. Such systems are, therefore, termed fail-safe. As an alternative multiple redundancy solutions could be provided, in which faults in the redundant subsystems are automatically compensatable, such systems being termed error tolerant.

BRIEF SUMMARY OF THE INVENTION

The invention provides a steering system with which the functions as cited above are achievable by particularly simple means whilst simultaneously assuring satisfaction of all safety requirements. This is by means of a steering system which comprises a steering linkage, a control hydraulic motor and a control hydraulic circuit, a steering wheel connected to the control hydraulic motor, and a control hydraulic cylinder connected to the control hydraulic motor by the control hydraulic circuit. The vehicle steering system further comprises a servohydraulic cylinder, a servopump, a servohydraulic circuit connecting the servopump to the servohydraulic cylinder, and an electronic control circuit which controls the servohydraulic circuit. The control hydraulic circuit, which is permanently closed, transfers the steering movements of the steering wheel by displacement of a volume of hydraulic fluid non positively to the front wheels. The control hydraulic circuit thus serves as a fallback, i.e. should the system develop a fault, e.g. due to a power failure, the steerability of the vehicle is still assured.

In accordance with one preferred embodiment of the invention it is provided for that a position sensor is arranged at the steering linkage and that an angle sensor is arranged at the steering wheel. The information furnished by the two sensors serves, for one thing, to control the servohydraulic circuit in normal operation and, for another, the information is made use of in emergency operation to operate the servohydraulic circuit as a simple closed positioning loop.

In accordance with the preferred embodiment a modulator pump is provided connected in parallel to the control hydraulic cylinder in the control hydraulic circuit, this modulator pump being capable of supplying a hydraulic flow superimposing that furnished by the control hydraulic motor. The modulator hydraulic circuit thus formed enables a variable steering translation and an active steering angle correction to be made available without the control hydraulic circuit needing to be opened. Depending on the hydraulic flow made available by the modulator pump, the hydraulic flow of the control hydraulic motor can be boosted, diminished or even overcompensated. In conjunction with the position sensor and the angle sensor which sense the position of the steering wheel and the position of the steering linkage, the modulator hydraulic circuit is able to synchronize the position of the steering wheel relative to the position of the steering linkage. This is why an internal leakage in the control hydraulic circuit is tolerable.

Preferably a solenoid valve is disposed between the modulator pump and the control hydraulic circuit, by means of which valve the modulator pump can be decoupled from the control hydraulic circuit. In this arrangement the solenoid valve is urged by a spring mechanically into a position in which the modulator pump is decoupled from the control hydraulic circuit. This configuration too, serves to achieve a high fail-safe response; by mechanically acting upon the solenoid valve, the system automatically returns to fallback when, for instance, no further supply voltage at all is available.

The electronic control circuit is able to receive a vehicle speed signal and a vehicle yaw rate signal and is able to control the modulator pump as a function of these signals as well as of the signals of the position sensor at the steering linkage and at the steering wheel. It is in this way that active dynamic correction of the steering angle is made possible irrespective of the steering movements by the driver.

In accordance with the preferred embodiment of the invention it is provided for that in the control hydraulic circuit a valve is arranged by means of which the connection of the control hydraulic motor to the control hydraulic circuit can be restricted or open-circuited. Thus, it can be prevented that the hydraulic flow furnished by the modulator pump has a reaction onto the control hydraulic motor and thus onto the steering wheel.

Preferably it is provided for that the valve by means of which the connection of the control hydraulic motor to the control hydraulic circuit can be restricted or open-circuited is mechanically urged into a position in which the connection of the control hydraulic motor to the control hydraulic circuit is totally open, this too, serving to enhance the fail-safe response.

Preferably a supply conduit is provided supplying via two check valves the control hydraulic circuit with hydraulic fluid so that even if a small leakage exists in the control hydraulic circuit the functioning of the control hydraulic circuit continues to be assured.

Preferably each of the two check valves is provided with a pilot conduit which is pressurized by the pressure in the opposite line of the control hydraulic circuit. This enables the check valve, in the line of the circuit which is the low-pressure line at the time, to open when a predetermined pressure in the high-pressure line is exceeded, thus preventing an excessively high pressure arising in the control hydraulic circuit.

In accordance with the preferred embodiment of the invention in the control hydraulic circuit two pressure sensors are arranged in the two feed conduits to the control hydraulic cylinder, the signals of the two pressure sensors being made available to the electronic control circuit. The pressure sensors enable the effective steering forces to be sensed and the servohydraulic circuit to be suitably controlled as a function of these steering forces.

Preferably in the servo hydraulic circuit two pressure sensors are arranged in the two feed conduits to the servohydraulic cylinder, the signals of the two pressure sensors being made available to the electronic control circuit. These two pressure sensors serve to feed back the actual value of the boosted steering force to the electronic control circuit.

Advantageous aspects of the invention read from the sub-claims.

BRIEF DESCRIPTION OF THE DRAWINGS

In the sole drawing, a steering system in accordance with the invention is schematically shown.

DETAILED DESCRIPTION OF THE PREFERRED EMBODIMENT

Referring now to the sole drawing, an outline of a motor vehicle is illustrated with a broken line designated V. The steering system in accordance with the invention serves to tilt steerable vehicle wheels 2 via a steering linkage 4 as a function of the actuation of a steering wheel 6, a positioning cylinder 8 being provided for actuating the steering linkage. For actuating the positioning cylinder a total of three hydraulic circuits is provided, namely a control hydraulic circuit, a modulator hydraulic circuit and a servohydraulic circuit.

The control hydraulic circuit 10 serves to couple the steering wheel to the steering linkage, it comprising a double-acting control hydraulic cylinder 12 as well as a control hydraulic motor 14 connected to the steering wheel 6. Arranged in the control hydraulic circuit 10 in the vicinity of the two inputs of the control hydraulic cylinder 12 are two pressure sensors 16. These make a signal available which is supplied to an electronic control circuit 18 depicted schematically.

Applied to the positioning cylinder 8 is a position sensor 20 whose signal is likewise made available to the electronic control circuit 18. In addition, the electronic control circuit 18 receives a signal of an angle sensor 22 assigned to the steering wheel 6.

Connected in parallel to the control hydraulic cylinder 12 is a modulator hydraulic circuit 40 serving to vary or correct the steering commands dictated by the steering wheel 6, it further comprising a modulator pump 42 which is driven by a motor 44. Also provided is a 4/2-way solenoid valve 46 mechanically urged by a spring into a position in which the modulator hydraulic circuit 40 is disconnected from the control hydraulic circuit 10.

Provided in the control hydraulic circuit 10 is a 4/2-way solenoid valve 46 mechanically urged by a spring into a position in which the solenoid valve is fully open. This solenoid valve 24 permits decoupling the control hydraulic motor 14 either partly, when the solenoid valve 24 acts as a restriction, or even totally from the control hydraulic circuit 10.

Provided separately from the control hydraulic circuit is a servohydraulic circuit 60 serving to boost the steering force in reducing the force needed to actuate the steering to a reasonable degree.

The servohydraulic circuit 60 contains a double-acting servohydraulic cylinder 62 engaging the positioning cylinder 8 in the same way as the control hydraulic cylinder 12, the positioning cylinder thus being configured as a twin hydraulic cylinder.

Arranged in the servohydraulic circuit 60 in the vicinity of the inputs of the servohydraulic cylinder 62 are two pressure sensors 64 whose signals are delivered to the electronic control circuit 18. Further arranged in the servohydraulic circuit is a servopump 66 powered by a motor 68. Connected in parallel to the servopump 66 is a restriction valve 70. In addition, two 4/2-way solenoid valves 72 are provided in the servohydraulic circuit 60 which act as restriction valves. The two solenoid valves 72 are connected such that an open-center circuit is achieved, they being urged mechanically by a spring into a position in which they are fully open.

Leading from the servohydraulic circuit 60 to the control hydraulic circuit 10 is a supply conduit 80 provided with a pressure reduction valve 82, the supply conduit being connected to the control hydraulic circuit by two check valves 84. Via the supply conduit 80 it is assured that the control hydraulic circuit 10 has a supply of hydraulic fluid at all times. Each of the check valves is provided with a pilot conduit pressurized by the pressure in the opposite line of the control hydraulic circuit, thus enabling the control hydraulic circuit to be relieved should an overpressure occur.

The functioning of the steering system as described will now be explained. When the steering wheel 6 is actuated a hydraulic flow is created in the control hydraulic motor 14 which produces via the control hydraulic cylinder 12 a steering movement of the positioning cylinder 8 and thus of the steering linkage 4. Depending on the steering forces acting here and being sensed by the pressure sensors 16 and made available to the electronic control circuit, a suitable hydraulic flow is furnished in the servohydraulic circuit 60, which flow produces in the servohydraulic cylinder 62 a force boosting the steering. This force boosting the steering is practically freely programmable and adaptable on the basis of parameters such as the speed of the vehicle or the pressure existing in the control hydraulic circuit 10. Usually in this arrangement the force boosting the steering as provided by the servohydraulic cylinder 62 amounts at the most to 10 times the steering force provided by the control hydraulic cylinder 12.

The modulator pump 42 enables the hydraulic flow furnished by the control hydraulic motor 14 to be superimposed by a modulator flow thus enabling, for example, the steering translation to be varied. For instance, at low speeds the tendency is to provide a lower steering translation to produce the large tilting movement of the wheels 2, as needed when parking, by a comparatively small steering deflection. For this purpose, in addition to the hydraulic flow furnished by the control hydraulic motor 14, a modulator hydraulic flow acting in the same direction is superimposed. When, however, an indirect steering translation is desired, for example to ensure the desired soft response of the steering at high vehicle speeds, the volume flow made available by the control hydraulic motor 14 is superimposed by a modulator hydraulic flow acting in the opposite direction.

In operation of the modulator circuit the solenoid valve 24 serves to vary the feedback of the pressure in the control hydraulic circuit 10 on the control hydraulic motor 14 in such a manner that the driver receives via the steering wheel 6 a feel for the correct information as to the steering forces and cornering forces actually effective at the wheels 2.

One important aspect of the modulator hydraulic circuit 40 is that it does not open-circuit the control hydraulic circuit 10, i.e. the latter always being closed. This is of vital significance as regards the fail-safe response, i.e. the control hydraulic circuit 10 is available as a fallback under all circumstances. Even if both the servohydraulic circuit and the modulator hydraulic circuit are defective, either due to a total power failure or due to a leakage in the corresponding circuit, the control hydraulic circuit ensures a non-positive connection from the steering wheel 6 to the steering linkage 4 so that the vehicle remains steerable.

Also important for the aspect of fail-safe response is that the servohydraulic circuit 60 is totally decoupled from the control hydraulic circuit 10, it serving merely to generate the forces needed to boost the steering, the same as in a conventional servohydraulic steering system.

Another safety function is achieved with the aid of the position sensor 20 and the steering angle sensor 22. Should a leakage occur in the control hydraulic circuit 10 which open-circuits the non-positive connection between steering wheel 6 and steering linkage 4, then by means of the two sensors and the servohydraulic circuit 60 a closed positioning loop may be formed which controls the position of the positioning cylinder 8 as a function of the values dictated by the steering wheel 6 and sensed by the steering angle sensor 22.

Should an internal leakage occur in the control hydraulic circuit 10 the position of the steering wheel can be synchronized relative to the position of the steering linkage by means of the modulator hydraulic circuit 40 by the position of the steering wheel being compared to the position of the steering linkage by means of the corresponding sensors.

What is claimed is:

1. A vehicle steering system comprising a steering linkage, a control hydraulic motor and a control hydraulic circuit, a steering wheel connected to said control hydraulic motor, a control hydraulic cylinder connected to said control hydraulic motor by said control hydraulic circuit, a servohydraulic cylinder, a servopump, a servohydraulic circuit connecting said servopump to said servohydraulic cylinder, and an electronic control circuit which controls said servohydraulic circuit, wherein in said control hydraulic circuit a modulator pump is provided connected in parallel to said control hydraulic cylinder, said modulator pump being capable of supplying a hydraulic flow which is superimposed a hydraulic flow furnished by said control hydraulic motor.

2. The steering system as set forth in claim 1, wherein between said modulator pump and said control hydraulic circuit a solenoid valve is disposed adapted to decouple said modulator pump from said control hydraulic circuit, said solenoid valve being urged by a spring mechanically into a position in which said modulator pump is decoupled from said control hydraulic circuit.

3. The steering system as set forth in claim 1, wherein said electronic control circuit receives a vehicle speed signal and controls said modulator pump as a function of said signal.

4. The steering system as set forth in claim 1, wherein said electronic control circuit receives a vehicle yaw rate signal and controls said modulator pump as a function of said signal.

* * * * *